United States Patent [19]

Fukinuki

[11] Patent Number: 4,945,402
[45] Date of Patent: Jul. 31, 1990

[54] METHOD FOR PRODUCING NTSC COMPATIBLE SIGNAL FOR WIDESCREEN TV SYSTEM

[75] Inventor: Takahiko Fukinuki, Kokubunji, Japan

[73] Assignee: Hitachi, Ltd., Tokyo, Japan

[21] Appl. No.: 266,840

[22] Filed: Nov. 3, 1988

[30] Foreign Application Priority Data

Nov. 11, 1987 [JP] Japan .................................. 62-283282

[51] Int. Cl.⁵ .......................... H04N 7/08; H04N 11/06
[52] U.S. Cl. .......................................... 358/12; 358/16; 358/142
[58] Field of Search ...................... 358/11, 12, 16, 142, 358/146

[56] References Cited

U.S. PATENT DOCUMENTS 4,581,640  4/1986  Cole ..................................... 358/141
4,660,072  4/1987  Fukinuki .............................. 358/12
4,745,460  5/1988  Fukinuki .............................. 358/12

OTHER PUBLICATIONS

A Single Channel, NTSC Compatible Widescreen EDTV System, by Isnardi et al., pp. 1 to 5.

Primary Examiner—Tommy P. Chin
Attorney, Agent, or Firm—Antonelli, Terry, Stout & Kraus

[57] ABSTRACT

A method for producing an NTSC compatible television signal for a widescreen television system having a widescreen panel includes deriving a luminance signal of a central portion of the widescreen panel, deriving a color signal modulated in response to the luminance signal according to the NTSC system, deriving a time-expanded signal from luminance signals of two sides of the widescreen panel modulating a sub-carrier so that a scanning line of identical phase drops down for each field, and deriving a time-expanded color signal from color signal of the two sides of the widescreen panel modulating the sub-carrier and having a phase which is the same in every scanning line in a field and which is inverse with response to the phase for the adjacent fields and having a horizontal frequency of the time-expanded luminance signal. The luminance signal, color signal, time-expanded luminance signal and time-expanded color signal are multiplexed so as to enable production of the NTSC compatible television signal.

1 Claim, 3 Drawing Sheets

METHOD FOR PRODUCING NTSC COMPATIBLE SIGNAL FOR WIDESCREEN TV SYSTEM

BACKGROUND OF THE INVENTION

The present invention relates to a higher definition widescreen TV system compatible with the NTSC system and, more particularly, a method for maintaining the resolution of the luminance signal of a central portion of a screen as much as possible.

As a system which is compatible with the existing NTSC system for transmitting a TV signal for a widescreen, there is proposed "A Single Channel, NTSC Compatible Widescreen EDTV System", by Isnardi et al.

According to this system, as shown in FIG. 2, the central portion CENT of a component 1 having an aspect ratio of approximately 5:3 is transmitted substantially according to the existing NTSC system. The right and left side panels are attached to the small portions at the ends of the existing image such that only their luminance low-frequency components are time-compressed. These attached side portions are exclusively modulated to the NTSC color TV signals and time-expanded about four times (or the band width is dropped to about ¼) to form a component 3.

These are illustrated in a one-dimensional frequency region in FIGS. 1A to 1D.

In FIG. 1A, letter E designates the well-known NTSC color TV signals corresponding to the two side panels. These color TV signals are time-expanded four times, as indicated at Es in FIG. 1B.

Then, these signals are multiplexed to form a component 2 appearing in FIG. 2. These relations are illustrated three-dimensionally inn FIGS. 3A and 3B. In the NTSC system, as is well known in the art, the color signal is multiplexed on a luminance signal Y.

If a frequency spectrum is illustrated in the three-dimensional dimensional frequency domain with three frequencies, i.e., horizontal $\mu$, vertical $\nu$ and time f frequencies, as is disclosed in U.S. Pat. No. 4,660,072 granted to Fukinuki, the color signal C is present in the second and fourth quadrants, and the conjugate first and third quadrants are vacant.

In these quadrants, there may be arranged as luminance signal Ys of the signal Es to be newly multiplexed. For this operation, there may be used a sub-carrier $\lambda o$ in which a scanning line of identical phase drops for each field, as shown in FIG. 7 in the above-specified U.S. Pat. No. 4,660,072. The luminance signal Ys is illustrated in regions 10 and 10' in FIG. 3B.

In this case, the color components Cs of the signal Es are arranged at regions 11, 11', 11'' and 11'''.

Incidentally, the modulated two side panel signals modulate the sub-carrier $\mu o$ with double side-band modulation as shown in FIG. 1C. This modulation is accomplished for, e.g., multiplexing another signal on that band by, e.g., quadrature modulation. However, this modulation will be omitted because it has no direct relation to the present invention.

The problem accompanying the prior art described above is that the region 12 of the luminance component Y of the main signal (located at the central portion of the image) has to be largely cut off, as illustrated in FIG. 3A, so as to multiplex the double-side-band modulated color signals Cs, as shown in FIG. 3A. In other words, the luminance signal Y for a horizontal frequency $\mu$ of 1.5 MHz or higher has to be suppressed to about one half of the vertical frequency. The components to be cut correspond to the slant components of the image at the central portion. This cutting process will degrade the image quality seriously.

SUMMARY OF THE INVENTION

An object of the present invention is to minimize the cut of the slant components and accordingly to improve the image quality.

This object is achieved by replacing the double-sideband modulated signal of the double-side modulated color signals Cs of the image with respect to the sub-carrier $\mu o$, as shown in FIG. 1C, by a single-side-band modulated signal of double-side-band modulated color signals. As indicated at Esm' in FIG. 1D, more specifically, the luminance signals Ys are subjected to the double-side-band modulation with respect to the sub-carrier $\mu o$ whereas the color signals Cs may have only their upper bands left. This is because the regions 10 and 10' of the luminance signals Ys are arranged in the first and third quadrants, as shown in FIG. 3B, and other signals are multiplexed thereon, as has been described hereinbefore, whereas the color signals Cs 11, 11', 11'' and 11''' are arranged in other positions and can be separated.

This can be easily understood if it is thought that the signals Ys and Cs are modulated and multiplexed independently of each other in addition to the transformations of the signals such as the E, Es, Esm and Esm', as has been described with reference to FIGS. 1A to 1D.

DESCRIPTION OF THE PREFERRED EMBODIMENT

The embodiment of the present invention will be described in the following with reference to FIG. 4.

The important point of the present invention resides, as has been described hereinbefore, in that the time-expanded signal Esm having its double-side-band modulated image signals is not multiplexed, as it is, upon the original signal (i.e., the signal at the central portion thereof), but the signal Esm', from which is eliminated the lower side-band component Cs1 of the color signal Cs(i.e., Cs1 and Cs2) of the signal Esm, is multiplexed.

Figure 1A:
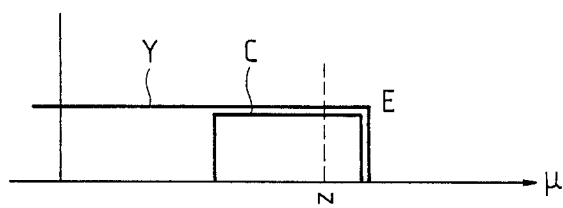
FIGS. 1A to 1D are diagrams showing the one-dimensional spectra of the signals corresponding to two side panel images of a screen according to one embodiment of the present invention.
Figure 1B:
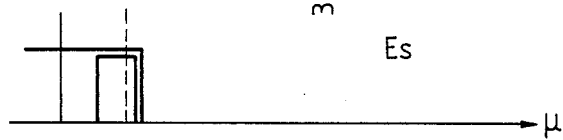
Figure 1C:
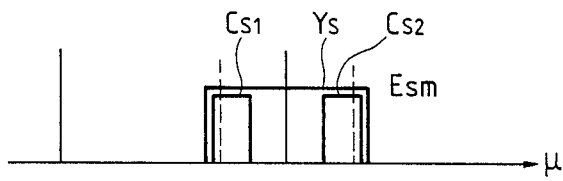
Figure 1D:
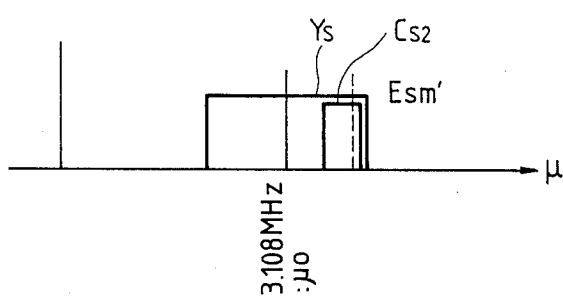
Figure 2:
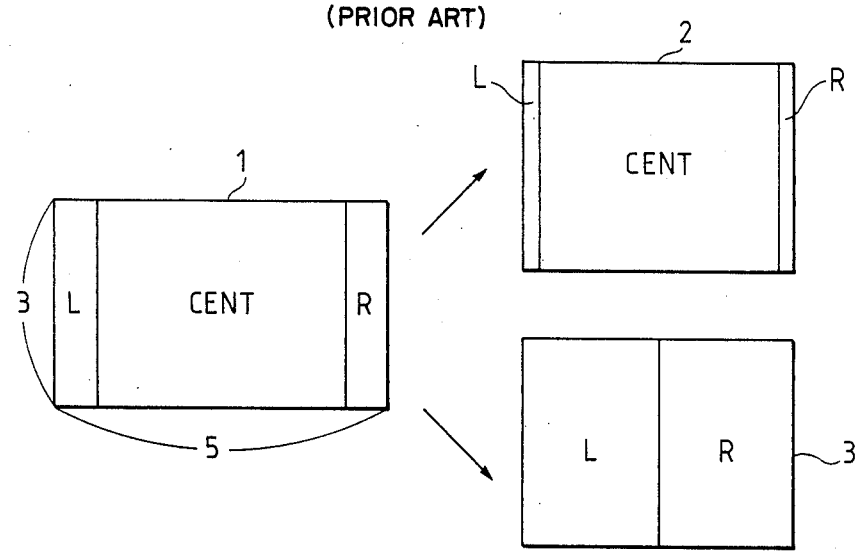
FIG. 2 is a diagram for explaining the relations of the screen of the system of the prior art, to which the present invention is to be applied.
Figure 3A:
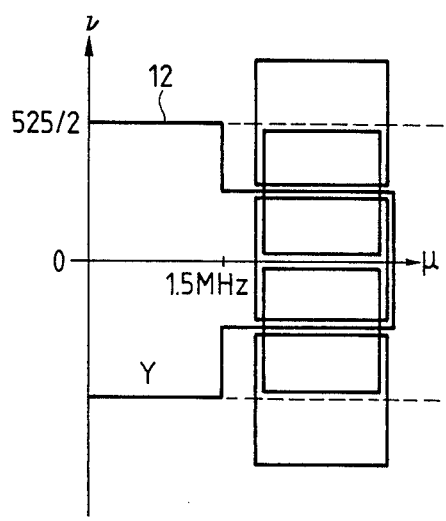
FIGS. 3A and 3B are diagrams for explaining the three-dimensional spectra of the system of the prior art.
Figure 3B:
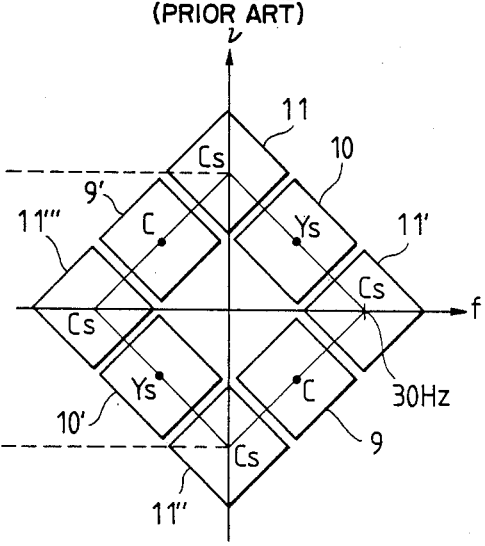

The color signal Cs is so located in the region [f−$\nu$] as is show in FIG. 3B. Therefore, the color signal Cs(Cs1 and Cs2) is extracted, and the lower band component Cs1 is filtered out by a band-pass filter of 2.0 to 2.5 MHz. Then, the signal Esm' can be attained by subtracting the color signal Cs1 from the signal Esm.

Figure 4:
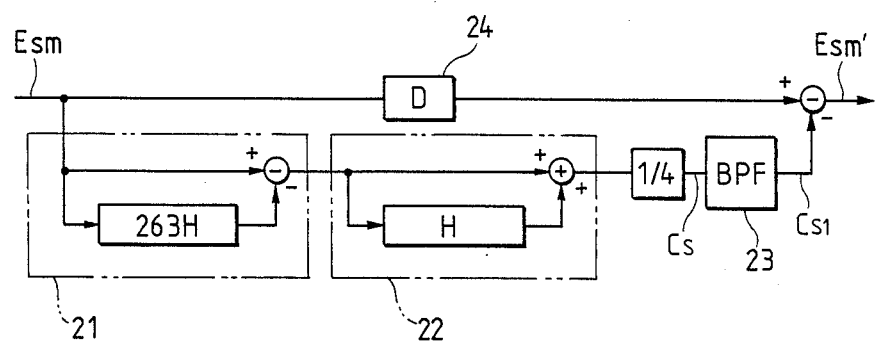
FIG. 4 is a diagram showing the structure of a signal processing circuit according to the embodiment of the present invention.

FIG. 4 shows a simple type of a filter arrangement for the above-specified operations, where 263H is a delay circuit for 263 horizontal periods. The signal components cs and Ys are extracted by a filter 21 from the signal Esm. As is apparent from FIG. 3B, the phase of the sub-carrier for Cs is the same in a field and inverse in adjacent fields, while the phase of the sub-carrier for Ys in a particular line is inverse with that of the line which is spaced apart by 263H. Then, the component Cs is filtered out together with adjoining scanning lines in the same field by a filter 22. The component Cs is then quartered since the component to be obtained is quadrupled by the difference in the filter 21 and the addition in the filter 22. The aforementioned lower-band component Cs1 is then extracted by a band-pass filter BPF 23 and such lower-band component Cs1 is subtracted from the signal Esm to produce the signal Esm'. Also a delay circuit 24 is provided for correcting the delay or the like of the filters.

Figure 5:
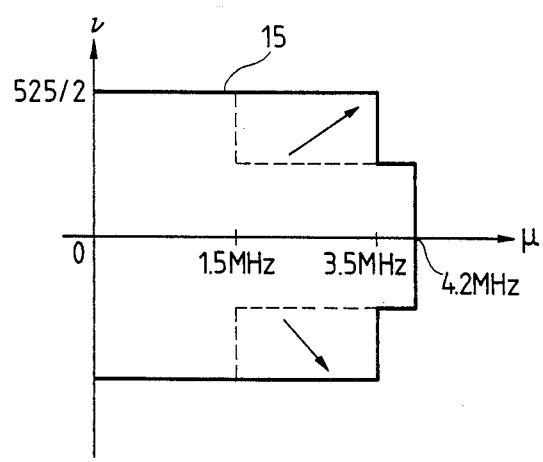
FIG. 5 is a diagram for explaining the luminance increasing effect of the embodiment of the present invention.

As a result, the eliminated portion of a region 15 of the luminance signal can be made smaller than that of FIG. 3A, as shown in FIG. 5. Thus, it is possible to improve the two-dimensional resolution of the luminance signal of the signal of the central portion of the central portion of the screen.

Here, the following modifications can be achieved:

(1) The filter for filtering out the color signal Cs is not limited to that having the simple structure shown in FIG. 4;

(2) The operations are not limited to the type in which the component Cs1 is subtracted from the signal Esm but may be of the type in which the luminance component Ys and color component Cs of the two-side signal are modulated and multiplexed upon the signal of the central portion of the screen; and (3) According to the above modification (2), it belongs to a general concept that the sub-carrier frequency for the color component Cs is a frequency which is obtained by dividing the color sub-carrier frequency by the inverse ratio of the sub-carrier frequency for the luminance component Ys plus the time elongation.

(4) In many cases, the power corresponding to the new slant region is very weak. Therefore the filter mentioned in FIG. 4 may be omitted for common use.

What is claimed is:

1. A method for producing an NTSC system compatible television signal for a widescreen television system having a widescreen panel, comprising the steps of:
    deriving a luminance signal of a central portion of the widescreen panel;
    deriving a color signal modulated in response to the luminance signal according to the NTSC system;
    deriving a time-expanded luminance signal of two sides of the widescreen panel modulating a sub-carrier so that a scanning line of identical phase drops down for each field;
    deriving a time-expanded color signal of the two sides of the widescreen panel modulating the sub-carrier having a phase which is the same in every scanning line in a field and which is inverse with respect to the phase for the adjacent fields and having a horizontal frequency which is higher than the horizontal frequency of the time-expanded luminance signal; and
    multiplexing the luminance signal, the color signal, the time-expanded luminance signal and the time-expanded color signal so as to enable production of the NTSC compatible television signal for the widescreen television system.

* * * * *